US007505950B2

(12) United States Patent
Tian et al.

(10) Patent No.: US 7,505,950 B2
(45) Date of Patent: Mar. 17, 2009

(54) SOFT ALIGNMENT BASED ON A PROBABILITY OF TIME ALIGNMENT

(75) Inventors: Jilei Tian, Tampere (FI); Jani Nurminen, Lempäälä (FI); Victor Popa, Tampere (FI)

(73) Assignee: Nokia Corporation, Espoo (FI)

( * ) Notice: Subject to any disclaimer, the term of this patent is extended or adjusted under 35 U.S.C. 154(b) by 188 days.

(21) Appl. No.: 11/380,289

(22) Filed: Apr. 26, 2006

(65) Prior Publication Data

US 2007/0256189 A1 Nov. 1, 2007

(51) Int. Cl.
*G06F 17/10* (2006.01)
*G06N 3/08* (2006.01)
*G10L 21/00* (2006.01)
*G10L 11/06* (2006.01)
*G10L 15/14* (2006.01)

(52) U.S. Cl. ....................... 706/45; 704/208; 704/256.7

(58) Field of Classification Search ................... 706/45; 704/203, 208, 256.1, 256.7
See application file for complete search history.

(56) References Cited

U.S. PATENT DOCUMENTS

2004/0024601 A1 2/2004 Gopinath et al.

OTHER PUBLICATIONS

Zuo et al., "Improving the Performance of MGM-Based Voice Conversion by Preparing Training Data Method", 2004.*
Yun et al., "A Distributed Memory MIMD Multi-Computer with Reconfigurable Custom Computing Capabilities", 1997.*
Yining Chen et al., "Voice Conversion with Smoothed GMM and MAP Adaptation", in Proc. of Eurospeech 2003—Geneva, pp. 2413-2416.
Alexander Kain et al., "Spectral Voice Conversion for Text-To-Speech Synthesis", in Proc. of ICASSP, 1998, 4 pages.
Steve Young et al. "HTK Book". Printed from http://htk.eng.cam.ac.uk/download.shtml on Jun. 24, 2006, 354 pages.
V. Wan et al., "Evaluation of Kernel Methods for Speaker Verification and Identification," Acoustics, Speech and Signal Processing, 2002. Proceedings. (ICASSP '02). IEEE International Conference on, I-669-I-672 vol. 1, pp. 669, line 10-line 11, sections 4.3 & 5.2.
Sheng LV et al., "Voice Conversion Algorithm Using Phoneme Gaussian Mixture Model," Intelligent Multimedia, Video and Speech Processing, 2004. Proceedings of 2004 International Symposium on, pp. 5-8, Oct. 20-22, 2004, sections 1 & 2.2.
Yu Yi-Kuo et al, "Statistical Significance of Probablistic Sequence Alignment and Related Local Hidden Markov Models", Journal of Computational Biology. 2001, vol. 8, No. 3, pp. 249-282. doi:10.1089/10665270152530845. Retrieved from: matisse.ucsd.edu/~hwa/pub/hybrid.pdf, appendix D.
P.A. Olsen et al., "Modeling Inverse Covariance Matrices by Basis Expansion", Speech and Audio Processing, IEEE Transactions on, vol. 12, No. 1, pp. 37-46, Jan. 2004, section II-preface.
International Search Report and Written Opinion, PCT/IB2007/000903, mail date Dec. 4, 2007.

* cited by examiner

*Primary Examiner*—David R Vincent
*Assistant Examiner*—Nathan H Brown, Jr.
(74) *Attorney, Agent, or Firm*—Banner & Witcoff, Ltd.

(57) ABSTRACT

Systems and methods are provided for performing soft alignment in Gaussian mixture model (GMM) based and other vector transformations. Soft alignment may assign alignment probabilities to source and target feature vector pairs. The vector pairs and associated probabilities may then be used calculate a conversion function, for example, by computing GMM training parameters from the joint vectors and alignment probabilities to create a voice conversion function for converting speech sounds from a source speaker to a target speaker.

39 Claims, 6 Drawing Sheets

SOFT ALIGNMENT BASED ON A PROBABILITY OF TIME ALIGNMENT

BACKGROUND

The present disclosure relates to transformation of scalars or vectors, for example, using a Gaussian Mixture Model (GMM) based technique for the generation of a voice conversion function. Voice conversion is the adaptation of characteristics of a source speaker's voice, (e.g., pitch, pronunciation) to those of a target speaker. In recent years, interest in voice conversion systems and applications for the efficient generation of other related conversion models has risen significantly. One application for such systems relates to the user of voice conversion in individualized text-to-speech (TTS) systems. Without voice conversion technology and efficient transformations of speech vectors from different speakers, new voices could only be created with time-consuming and expensive processes, such as extensive recordings and manual annotations.

Well-known GMM based vector transformation can be used in voice conversion and other transformation applications, by generating joint feature vectors based on the feature vectors of source and target speakers, then by using the joint vectors to train GMM parameters and ultimately create a conversion function between the source and target voices. Typical voice conversion systems include three major steps: feature extraction, alignment between the extracted feature vectors of source and target speakers, and GMM training on the aligned source and target vectors. In typical systems, the vector alignment between the source vector sequence and target vector sequence must be performed before training the GMM parameters or creating the conversion function. For example, if a set of equivalent utterances from two different speakers are recorded, the corresponding utterances must be identified in both recordings before attempting to build a conversion function. This concept is known as alignment of the source and target vectors.

Conventional techniques for vector alignment are typically either performed manually, for example, by human experts, or automatically by a dynamic time warping (DTW) process. However, both manual alignment and DTW have significant drawbacks that can negatively impact the overall quality and efficiency of the vector transformation. For example, both schemes rely on the notion of "hard alignment." That is, each source vector is determined to be completely aligned with exactly one target vector, or is determined not to be aligned at all, and vice versa for each target vector.

Referring to FIG. 1, an example of a conventional hard alignment scheme is shown between a source vector sequence 110 and a target vector sequence 120. Vector sequences 110 and 120 contain sets of feature vectors $x_1$-$x_{16}$, and $y_1$-$y_{12}$, respectively, where each feature vector (speech vector) may represent, for example, a basic speech sound in a larger voice segment. These vector sequences 110 and 120 may be equivalent (i.e., contain many of the same speech features), such as, for example, vector sequences formed from audio recordings of two different people speaking the same word or phrase. As shown in FIG. 1, even equivalent vector sequences often contain different numbers of vectors, and may also have equivalent speech features (e.g., $x_{16}$ and $y_{12}$) in different locations in the sequence. For example, the source speaker may pronounce certain sounds slower than the target speaker, or may pause slightly longer between sounds than the target speaker, etc. Thus, the one-to-one hard alignment between the source and target vectors often results in discarding certain feature vectors (e.g., $x_4$, $x_5$, $x_{10}$, . . . ), or in duplication or interpolation of feature vectors to create additional pairs for alignment matching. As a result, small alignment errors may be magnified into larger errors, and the entire alignment process may become more complex and expensive. Finally, hard alignment may simply be impossible in many instances. Feature vectors extracted from human speech often cannot be perfectly aligned even by the best human experts or any DTW automation. Thus, hard alignment implies a certain degree of error even if performed flawlessly.

As an example of alignment error magnification resulting from a hard alignment scheme, FIG. 2 shows a block diagram of a source sequence 210 and target sequence 220 to be aligned for a vector transformation. The sequences 210 and 220 are identical in this example, but have been decimated by two on distinct parities. Thus, as in many real-world scenarios, perfect one-to-one feature vector matching is impossible because perfectly aligned source-target vector pairs are not available. Using a hard alignment scheme, each target vector has been paired with its nearest source vector and the pair is assumed thereafter to be completely and perfectly aligned. Thus, alignment errors might not be detected or taken into account because other nearby vectors are not considered in the alignment process. As a result, the hard alignment scheme may generate introduce noise into the data model, increase alignment error, and result in greater complexity for the alignment process.

Accordingly, there remains a need for methods and systems of aligning data sequences for vector transformations, such as GMM based transformations for voice conversion.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

According to one aspect of the present disclosure, alignment between source and target vectors may be performed during a transformation process, for example, a Gaussian Mixture Model (GMM) based transformation of speech vectors between a source speaker and a target speaker. Source and target vectors are aligned, prior to the generation of transformation models and conversion functions, using a soft alignment scheme such that each source-target vector pair need not be one-to-one completely aligned. Instead, multiple vector pairs including a single source or target vector may be identified, along with an alignment probability for each pairing. A sequence of joint feature vectors may be generated based on the vector pairs and associated probabilities.

According to another aspect of the present disclosure, a transformation model, such as a GMM model and vector conversion function may be computed based on the source and target vectors, and the estimated alignment probabilities. Transformation model parameters may be determined by estimation algorithms, for example, an Expectation-maximization algorithm. From these parameters, model training and conversion features may be generated, as well as a conversion function for transforming subsequent source and target vectors.

Thus, according to some aspects of the present disclosure, automatic vector alignment may be improved by using soft alignment, for example, in GMM based transformations used in voice conversion. Disclosed soft alignment techniques may reduce alignment errors and allow for increased efficiency and quality when performing vector transformations.

BRIEF DESCRIPTION OF THE DRAWINGS

Figure 1:
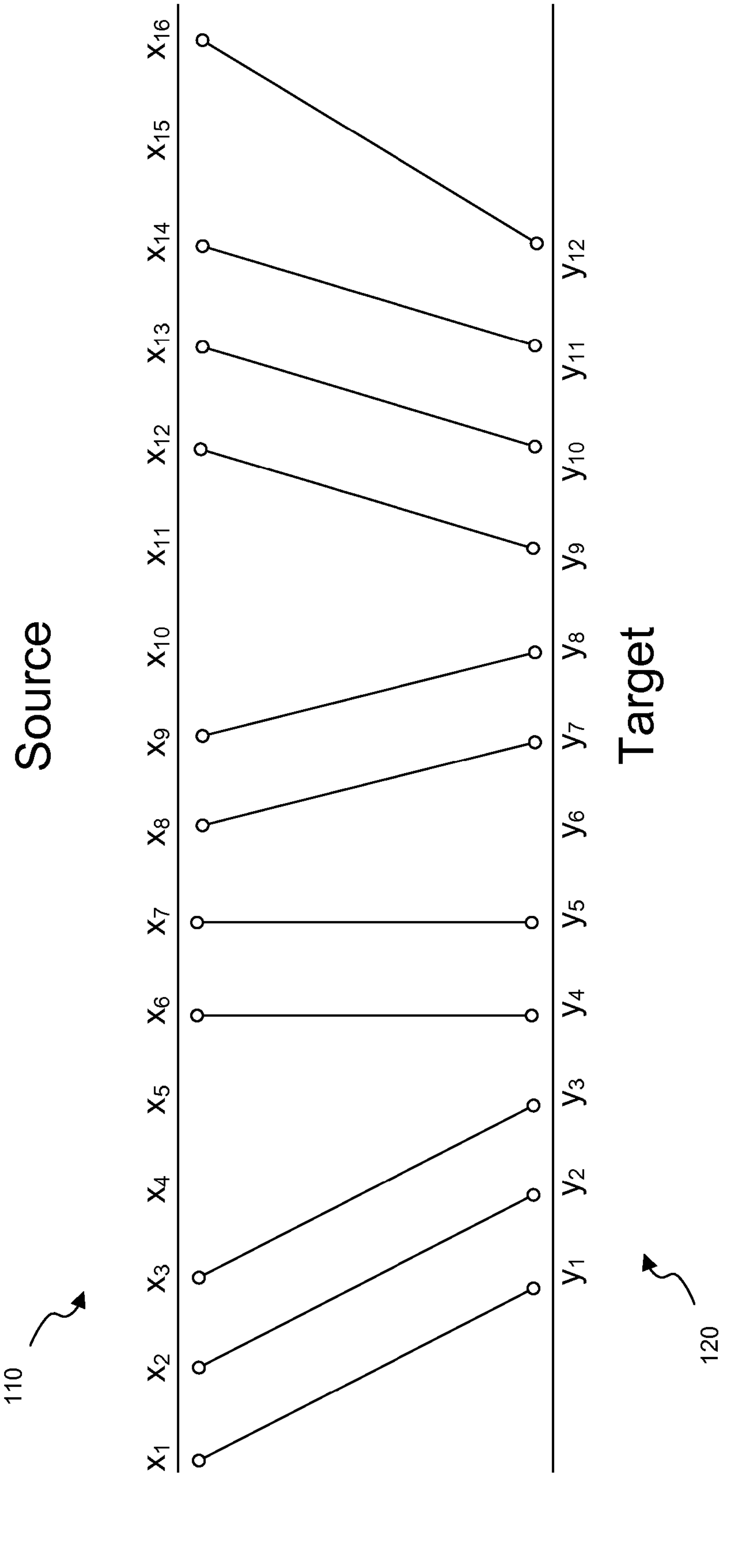
FIG. 1 (PRIOR ART)
Figure 2:
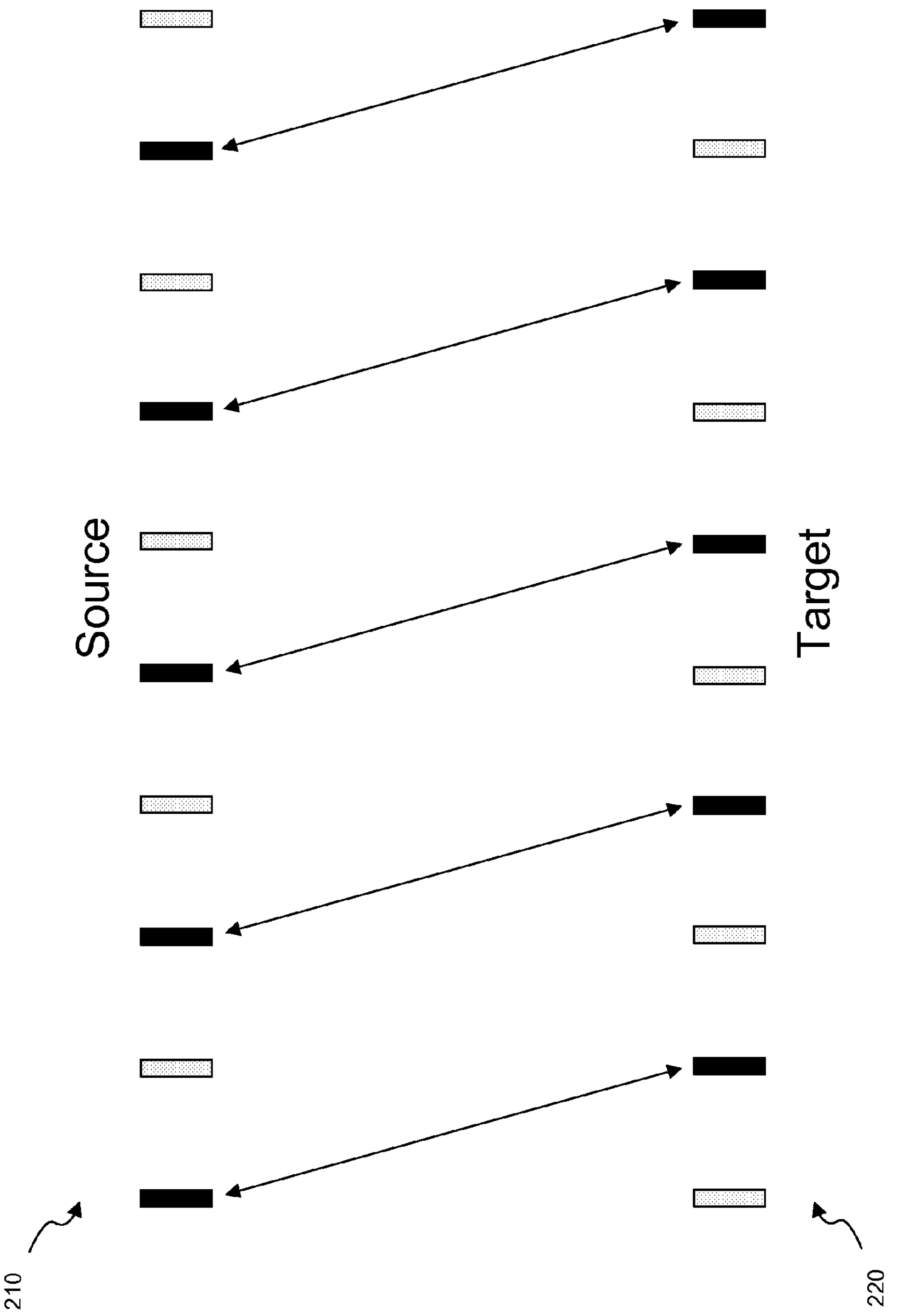
FIG. 2 (PRIOR ART)
Figure 3:
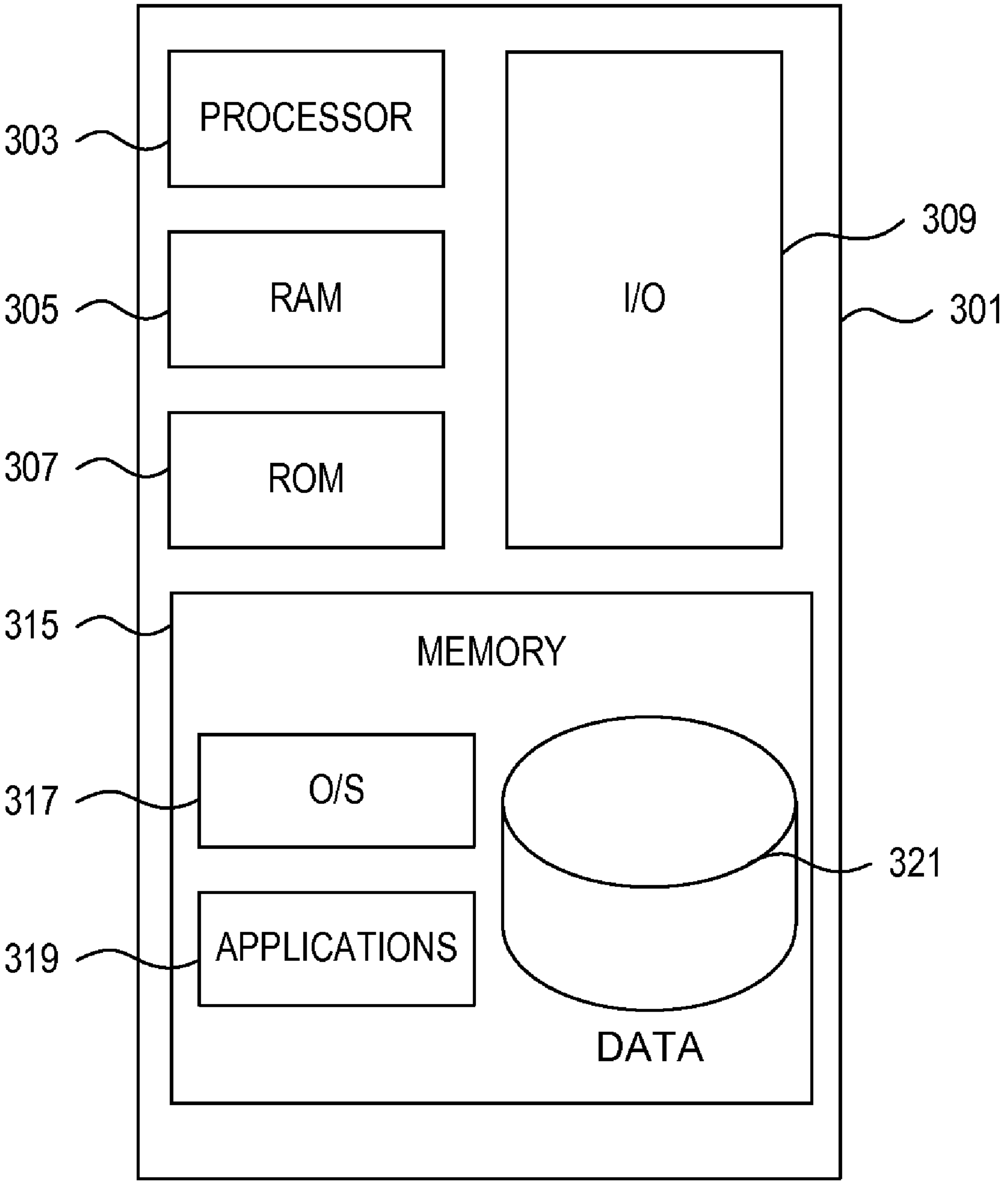
Figure 4:
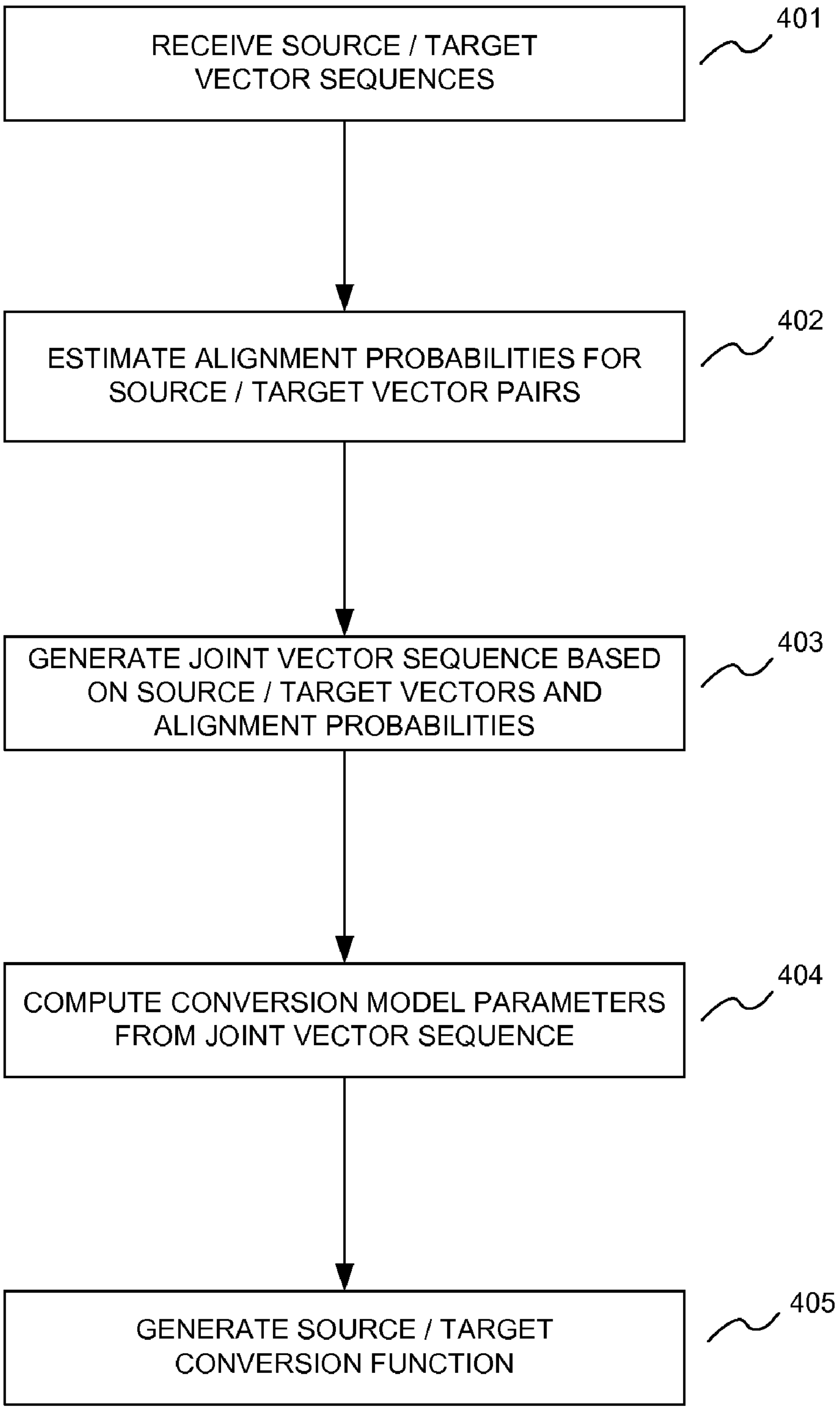
Figure 5:
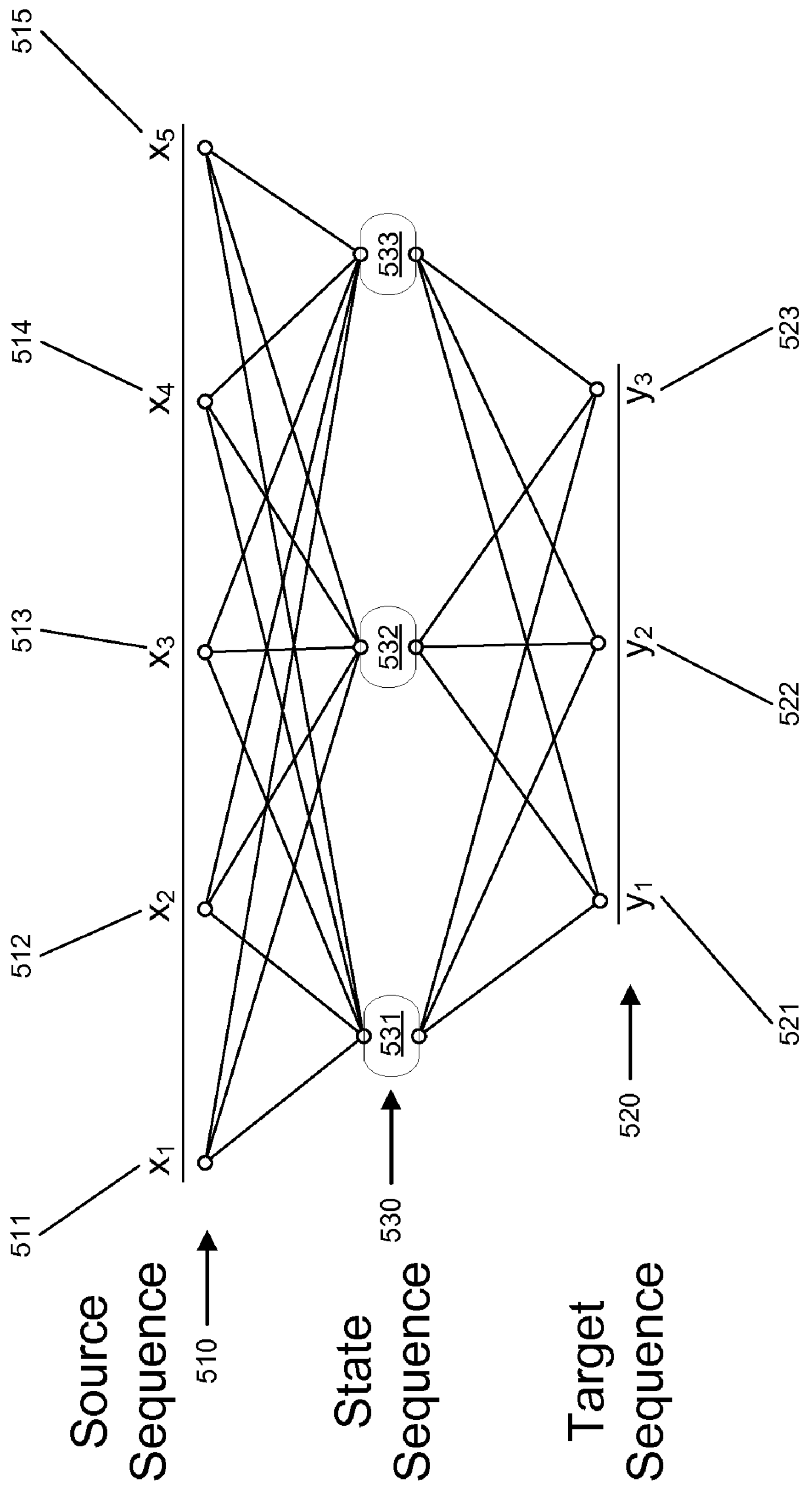
Figure 6:
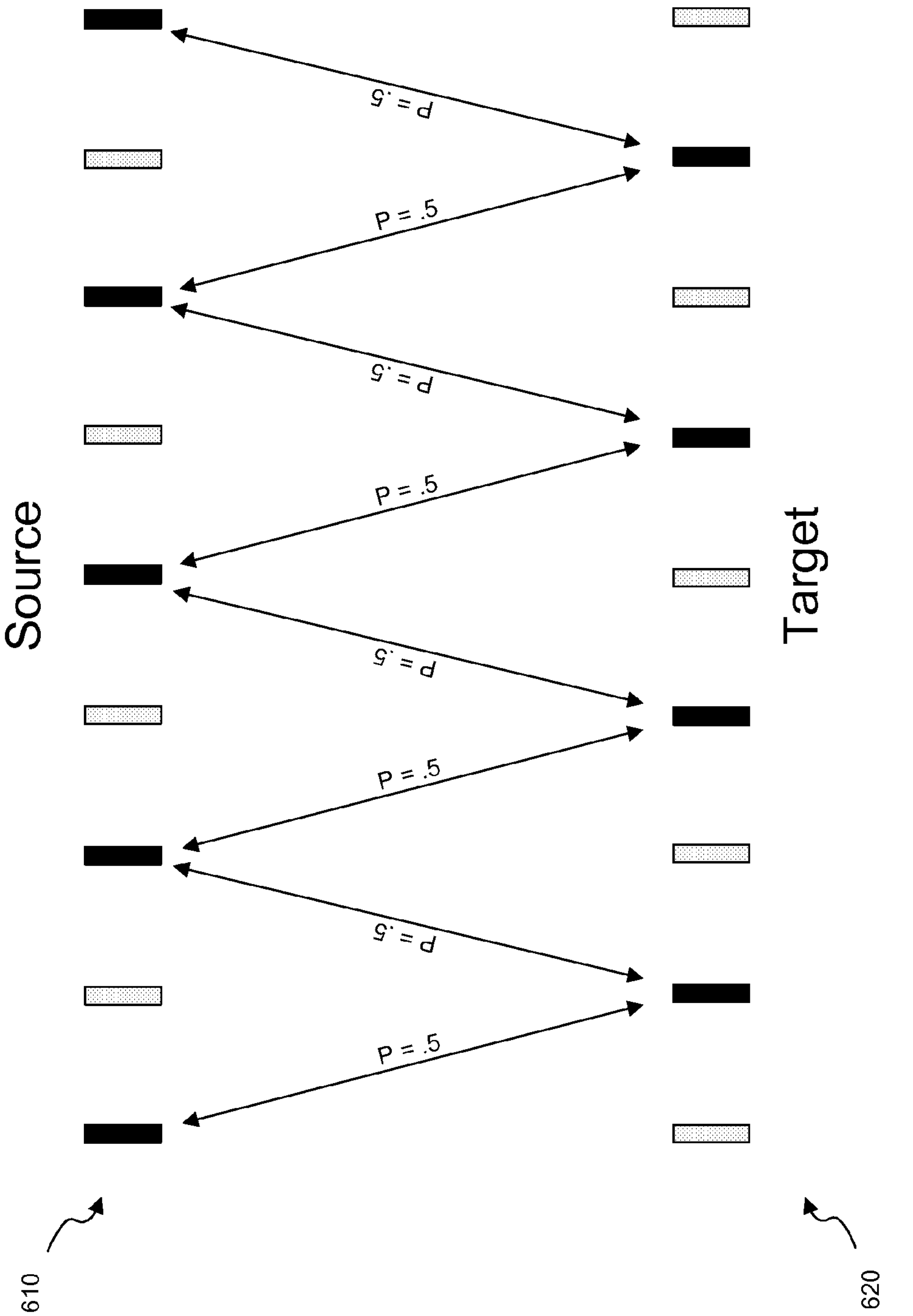

Having thus described the invention in general terms, reference will now be made to the accompanying drawings, which are not necessarily drawn to scale, and wherein:

FIG. 1 is a line diagram illustrating a conventional hard alignment scheme for use in vector transformation;

FIG. 2 is a block diagram illustrating a conventional hard alignment scheme for use in vector transformation; FIG. 2 illustrates a block diagram of a tracking device FIG. 3 is a block diagram illustrating a computing device, in accordance with aspects of the present disclosure;

FIG. 4 is a flow diagram showing illustrative steps for performing a soft alignment between source and target vector sequences, in accordance with aspects of the present disclosure;

FIG. 5 is a line diagram illustrating a soft alignment scheme for use in vector transformation, in accordance with aspects of the present disclosure; and FIG. 6 is a block diagram illustrating a soft alignment scheme for use in vector transformation, in accordance with aspects of the present disclosure.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

FIG. 3 illustrates a block diagram of a generic computing device 301 that may be used according to an illustrative embodiment of the invention. Device 301 may have a processor 303 for controlling overall operation of the computing device and its associated components, including RAM 305, ROM 307, input/output module 309, and memory 315.

I/O 309 may include a microphone, keypad, touchscreen, and/or stylus through which a user of device 301 may provide input, and may also include one or more of a speaker for providing audio output and a video display device for providing textual, audiovisual and/or graphical output.

Memory 315 may store software used by device 301, such as an operating system 317, application programs 319, and associated data 321. For example, one application program 321 used by device 301 according to an illustrative embodiment of the invention may include computer executable instructions for performing vector alignment schemes and voice conversion algorithms as described herein.

Referring to FIG. 4, a flow diagram is shown describing the generation of a conversion function used, for example, in GMM vector transformation. In this example, the function may be related to voice conversion/speech conversion, and may involve the transformation of vectors representing speech characteristics of a source and target speaker. However, the present disclosure is not limited to such uses. For example, any Gaussian mixture model (GMM) based transformation, or other data transformations requiring a scalar or vector alignment may be used in conjunction with the present disclosure. In addition to GMM-based techniques, the present disclosure may relate to vector transformations and data conversion using other techniques, such as, for example, codebook-based vector transformation and/or voice conversion.

In step 401, source and target feature vectors are received. In this example, the feature vectors may correspond to equivalent utterances made by a source speaker and a target speaker, and recorded and segmented into digitally represented data vectors. More specifically, the source and target vectors may each be based on a certain characteristic of a speaker's voice, such as pitch or line spectral frequency (LSF). In this example, the feature vectors associated with the source speaker may be represented by the variable $x=[x_1, x_2, x_3 \ldots x_t \ldots x_m]$, while the feature vectors associated with the target speaker may be represented by the variable $y=[y_1, y_2, y_3 \ldots y_t \ldots y_n]$, where $x_t$ and $y_t$ are the speech vectors at the time t.

In step 402, alignment probabilities are estimated, for example, by computing device 301, for different source-target vector pairs. In this example, the alignment probabilities may be estimated using techniques related to Hidden Markov Models (HMM), statistical models related to extracting unknown, or hidden, parameters from observable parameters in a data distribution model. For example, each distinct vector in the source and target vector sequences may be generated by a left-to-right finite state machine that changes state once per time unit. Such finite state machines may be known as Markov Models. In addition, alignment probabilities may also be training weights, for example, values representing weights used to generate training parameters for a GMM based transformation. Thus, an alignment probability need not be represented as a value in a probability range (e.g., 0 to 1, or 0 to 100), but might be a value corresponding to some weight in the training weight scheme used in a conversion.

Smaller sets of vectors in the source and target vector sequences may represent, or belong to, a phoneme, or basic unit of speech. A phoneme may correspond to a minimal sound unit affecting the meaning of a word. For example, the phoneme 'b' in the word "book" contrasts with the phoneme 't' in the word "took," or the phoneme 'h' in the word "hook," to affect the meaning of the spoken word. Thus, short sequences of vectors, or even individual vectors, from the source and target vector sequences, also known as feature vectors, may correspond to these 'b', 't', and 'h' sounds, or to other basic speech sounds. Feature vectors may even represent sound units smaller than phonemes, such as sound frames, so that the time and pronunciation information captured in the transformation may be even more precise. In one example, an individual feature vector may represent a short segment of speech, for example, 10 milliseconds. Then, a set of feature vectors of similar size together may represent a phoneme. A feature vector may also represent a boundary segment of the speech, such as a transition between two phonemes in a larger speech segment.

Each HMM subword model may be represented by one or more states, and the entire set of HMM subword models may be concatenated to form the compound HMM model, consisting of the state sequence M of joint feature vectors, or states. For example, a compound HMM model may be generated by concatenating a set of speaker-independent phoneme based HMMs for intra-lingual language voice conversion. As another example, a compound HMM model might even be generated be concatenating a set of language-independent phoneme based HMMs for cross-lingual language voice conversion. In each state j of the state sequence M, the probability of j-th state occupation at time t of the source may be denoted as $LS_j(t)$, while the probability of target occupation of the same state j at the same time t may be denoted as $LT_j(t)$. Each of these values may be calculated, for example, by computing device 301, using a forward-backward algorithm, commonly known by those of ordinary skill in the art for computing the probability of a sequence of observed events, especially in the context of HMM models. In this example, the forward probability of j-th state occupation of the source may be computed using the following equation:

$$\alpha_j(t)=P(x_1, \ldots ,x_t,x(t)=j|M)=[{}^{N-1}\Sigma_{i=2}\alpha_i(t-1)*a_{ij}]*b_j(x_t) \quad \text{(Eq. 1)}$$

While the backward probability of j-th state occupation of the source may be computed using the similar equation:

$$\beta_j(t)=P(x_{t+1}, \ldots ,x_n|x(t)=j,M)={}^{N-1}\Sigma_{j=2}a_{ij}*b_j(x_{t+1})*\beta_i(t+1) \quad \text{(Eq. 2)}$$

Thus, the total probability of j-th state occupation at time t of the source may be computed with the following equation:

$$LS_j(x_t)=(\alpha_j(t)*\beta_j(t))/P(x|M) \quad \text{(Eq. 3)}$$

The probability of occupation at various times and states in the source and target sequence may be similarly computed. That is, equations corresponding to Eqs. 1-3 above may be applied to the feature vectors of target speaker. Additionally, these values may be used to compute a probability that a source-target vector pair is aligned. In this example, for a potentially aligned source-target vector pair (e.g., $x_p^T$ and $y_q^T$, where $x_p$ is the feature vector from the source speaker at time p, and $y_q$ is the feature vector from the target speaker at time q), an alignment probability ($PA_{pq}$) representing the probability that the feature vectors $x_p$ and $y_q$ are aligned may be calculated using the following equation:

$$\begin{aligned} PA(x_p, y_q) &= \sum_{l=1}^{L} PA(x_p, y_q \mid x(p)=l, y(q)=l) \\ &= \sum_{l=1}^{L} (PA(x_p \mid x(p)=l) * PA(y_q \mid y(q)=l)) \\ &= \sum_{l=1}^{L} LS_l(x_p) * LT_l(y_q) \end{aligned} \quad \text{(Eq. 4)}$$

In step 403, joint feature vectors are generated based on the source-target vectors, and based on the alignment probabilities of the source and target vector pairs. In this example, the joint vectors may be defined as $z_k=z_{pq}=[x_p^T, y_q^T, PA_{pq}]^T$. Since the joint feature vectors described in the present disclosure may be soft aligned, the alignment probability $PA_{pq}$ need not simply be 0 or 1, as in other alignment schemes. Rather, in a soft alignment scheme, the alignment probability $PA_{pq}$ might be any value, not just a Boolean value representing non-alignment or alignment (e.g., 0 or 1). Thus, non-Boolean probability values, for example, non-integer values in the continuous range between 0 and 1, may be used as well as Boolean values to represent a likelihood of alignment between the source and target vector pair. Additionally, as mentioned above, the alignment probability may also represent a weight, such as a training weight, rather than mapping to a specific probability.

In step 404, conversion model parameters are computed, for example, by computing device 301, based on the joint vector sequence determined in step 403. The determination of appropriate parameters for model functions, or conversion functions, is often known as estimation in the context of mixture models, or similar "missing data" problems. That is, the data points observed in the model (i.e., the source and target vector sequences) may be assumed to have membership in the distribution used to model the data. The membership is initially unknown, but may be calculated by selecting appropriate parameters for the chosen conversion functions, with connections to the data points being represented as their membership in the individual model distributions. The parameters may be, for example, training parameters for a GMM based transformation.

In this example, an Expectation-Maximization algorithm may be used to calculate the GMM training parameters. In this two-step algorithm, the prior probability may be measured in the Expectation step with the following equation:

$$P_{l,pq}=P(\iota|z_{pq})=(P_{pq}|\iota*P(\iota))/P(z_{pq})$$

$$P(z_{pq})={}^{L}\Sigma_{l=1}P(z_{pq}|\iota)*P(\iota)$$

$$\hat{}P_{\iota,pq}=PA(x_p,y_q)*P_{l,pq} \quad \text{(Eq. 5)}$$

The Maximization step, in this example, may be calculated by the following equation:

$$\hat{}P(\iota)=(1/m*n)*{}^{n}\Sigma_{p=1}{}^{m}\Sigma_{q=1}\hat{}P_{l,pq}$$

$$\hat{}u_l={}^{n}\Sigma_{p=1}{}^{m}\Sigma_{q=1}\hat{}P_{l,pq}*z_{pq}/{}^{n}\Sigma_{p=1}{}^{m}\Sigma_{q=1}\hat{}P_{l,pq}$$

$$\hat{}\Sigma_l={}^{n}\Sigma_{p=1}{}^{m}\Sigma_{q=1}\hat{}P_{l,pq}*(z_{pq}-\hat{}u_l)*(z_{pq}-\hat{}u_l)^T/{}^{n}\Sigma_{p=1}{}^{m}\Sigma_{q=1}\hat{}P_{l,pq} \quad \text{(Eq. 6)}$$

Note that in certain embodiments, a distinct set of features may be generated for GMM training and conversion in step 404. That is, the soft alignment feature vectors need not be the same as the GMM training and conversion features.

Finally, in step 405, a transformation model, for example a conversion function, is generated that may convert a feature from a source model x into a target model y. The conversion function in this example may be represented by the following equation:

$$F(x)=E(y|x)={}^{l}\Sigma_{l=1}p_l(x)*(\hat{}u_l^y+\hat{}\Sigma_l^{yx}(\hat{}\Sigma_l^{xx})^{-1}(x-\hat{}u_l^x)) \quad \text{(Eq. 7)}$$

This conversion function, or model function, may now be used to transform further source vectors, for example, speech signal vectors from a source speaker, into target vectors. Soft aligned GMM based vector transformations when applied to voice conversion may be used to transform speech vectors to the corresponding individualized target speaker, for example, as part of a text-to-speech (TTS) application. Referring to FIG. 5, a block diagram is shown illustrating an aspect of the present disclosure related to the generation of alignment probability estimates for source and target vector sequences. Source feature vector sequence 510 includes five speech vectors 511-515, while target feature vector sequence 520 includes only three speech vectors 521-523. As mentioned above, this example may illustrate other common vector transformation scenarios in which the source and target have different numbers of feature vectors. In such cases, many conventional methods may require discarding, duplicating, or interpolating feature vectors during vector alignment, so that both sequences contain the same number of vectors and can be one-to-one paired.

However, as described above, aspects of the present disclosure describe soft alignment of source and target vectors rather than requiring a hard one-to-one matching. In this example, state vector 530 contains three states 531-533. Each line connecting the source sequence vectors 511-515 to a state sequence 531 may represent the probability of occupation of the state 531 by that source vector 511-515 at time a t. When generating the state sequence according to the Hidden Markov Model (HMM) or similar modeling system, the state sequence 530 may have a state 531-533 corresponding to each time unit t. As shown in FIG. 5, one or more of both the source feature vectors 511-515 and the target feature vectors 521-523 might occupy the state 531 with some alignment probability. In this example, a compound HMM model may be generated by concatenating all states in the state sequence 530.

Thus, although a state in state sequence 530 may be formed on a single aligned pair, such as $[x_p^T, y_q^T, PA_{pq}]^T$, as described above in reference to FIG. 4, the present disclosure is not limited to a single aligned pair and a probability estimate for a state. For example, state 531 in state sequence 530 is formed from 5 source vectors 511-515, 3 target vectors 521-523, and the probability estimates for each of the potentially aligned source-target vector pairs.

Referring to FIG. 6, a block diagram is shown illustrating an aspect of the present disclosure related to conversion of source and target vector sequences. The simplified source vector sequence 610 and target vector sequence 620 were chosen in this example to illustrate the potential advantages of the present disclosure over the conventional hard aligned methods, such as the one shown in FIG. 2. In this example, the source vector sequence 610 and target vector sequence 620 are identical, except that decimation by two has been applied on distinct parities for the different sequences 610 and 620. Such decimation may occur, for example, with a reduction of the output sampling rate of the speech signals from the source and target, so that the samples may require less storage space.

Recall the conventional hard alignment described in reference to FIG. 2. In that conventional one-to-one mapping, each target feature vector was simply aligned with its nearest source feature vector. Since this conventional system assumes that the nearby pairs are completely and perfectly aligned, small alignment errors might not be detected or taken into account, since other nearby vectors are not considered. As a result, the hard alignment might be ultimately less accurate and more vulnerable to alignment errors.

Returning to FIG. 6, in this simple example, each target vector sample is paired with equal probabilities (0.5) to its closest two feature vectors in the source vector sequence. Converted features generated with soft alignment are not always one-to-one paired, but may also take into account other relevant feature vectors. Thus, conversion using soft alignment may be more accurate and less susceptible to initial alignment errors.

According to another aspect of the present disclosure, hard-aligned/soft-aligned GMM performance can compared using parallel test data such as that of FIGS. 2 and 6. For example, the converted features after the hard alignment and soft alignment of parallel data may be benchmarked, or evaluated, against the target features by using a mean squared error (MSE) calculation. The MSE, a well-known error computation method, is the square root of the sum of the standard error squared and the bias squared. The MSE provides a measure of the total error to be expected for a sample estimate. In the voice conversion context, for example, the MSE of different speech characteristics, such as pitch or line spectral frequency (LSF), may be computed and compared to determine an overall GMM performance of hard aligned versus soft aligned based GMM transformation. The comparison may be made more robust by performing the decimation and pairing procedure for each speech segment individually for the pitch characteristic, thus avoid cross-segment pairings. In contrast, the LSF comparison may only require the decimation and pairing procedure to be applied once for the entire dataset, since the LSF is continuous over speech and non-speech segments in the dataset.

In addition to the potential advantages gained by using soft alignment in this example, further advantages may be realized in more complex real-world feature vector transformations. When using more complex vector data, for example, with greater initial alignment errors and differing numbers of source and target feature vectors, hard alignment techniques often require discarding, duplicating, or interpolation vectors during alignment. Such operations may increase the complexity and cost of the transformation, and may also have a negative affect on the quality of the transformation by magnifying the initial alignment errors. In contrast, soft alignment techniques that might not require discarding, duplicating, or interpolating vectors during alignment, may provide increased data transformation quality and efficiency.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method comprising:

receiving a first sequence of feature vectors associated with a source speaker for processing based on operations controlled by a processor;

receiving a second sequence of feature vectors associated with a target speaker;

generating a third sequence of joint feature vectors, wherein the generation of each joint feature vector is based on:

a first vector from the first sequence;

a first vector from the second sequence; and a first probability value representing the probability that the first vector from the first sequence and the first vector from the second sequence are time aligned to the same feature in their respective sequences; and applying the third sequence of joint feature vectors as a part of a voice conversion process.

2. The method of claim 1, wherein the first sequence contains a different number of feature vectors than the second sequence.

3. The method of claim 1, wherein the first sequence corresponds to a plurality of utterances produced by a first speaker, and the second sequence corresponds to the same plurality of utterances produced by a second speaker, and wherein each of the feature vectors represents a basic speech sound in a larger voice segment.

4. The method of claim 1, wherein a Hidden Markov Model is applied to estimate the first probability value.

5. The method of claim 1, wherein the probability is a non-Boolean value.

6. The method of claim 1, wherein for the generation of the third sequence of joint feature vectors, the vector from the first sequence and the vector from the second sequence are different vectors for each joint feature vector in the third sequence.

7. The method of claim 1, wherein the generation of at least one of the joint feature vectors is further based on:

a second vector from the first sequence;

a second vector from the second sequence; and a second probability value representing the probability that the second vector from the first sequence and the second vector from the second sequence are aligned to the same feature in their respective sequences.

8. One or more computer readable media storing computer-executable instructions which, when executed by a processor, cause the processor to perform a method comprising:

receiving a first sequence of feature vectors associated with a source speaker;

receiving a second sequence of feature vectors associated with a target speaker;

generating a third sequence of joint feature vectors, wherein each joint feature vector is based on:

a first vector from the first sequence;

a second vector from the second sequence; and a probability value representing the probability that the first vector and the second vector are time aligned to the same feature in their respective sequences; and applying the third sequence feature vectors as a part of a voice conversion process.

9. The computer readable media of claim 8, wherein the first sequence contains a different number of feature vectors than the second sequence.

10. The computer readable media of claim 8, wherein the first sequence corresponds to a plurality of utterances produced by a first speaker, and the second sequence corresponds to the same plurality of utterances produced by a second speaker, and wherein each of the feature vectors represents a basic speech sound in a larger voice segment.

11. The computer readable media of claim 8, wherein a Hidden Markov Model is applied to estimate the probability value.

12. The computer readable media of claim 8, wherein the probability is a non-Boolean value.

13. The computer readable media of claim 8, wherein for the generation of the third sequence of joint feature vectors, the vector from the first sequence and the vector from the second sequence are different vectors for each joint feature vector in the third sequence.

14. The computer readable media of claim 8, wherein the generation of at least one of the joint feature vectors is further based on:

a second vector from the first sequence;

a second vector from the second sequence; and a second probability value representing the probability that the second vector from the first sequence and the second vector from the second sequence are aligned to the same feature in their respective sequences.

15. A method comprising:

receiving, a first data sequence associated with a first source speaker for processing based on operations control by a processor, receiving a second data sequence associated with a second source speaker;

identifying plurality of data pairs, each data pair comprising an item from the first data sequence and an item from the second data sequence;

determining a plurality of alignment probabilities, each alignment probability associated with one of the plurality of data pairs and comprising a probability value that the item from the first data sequence is time aligned with the item from the second data sequence;

determining a data transformation function based on the plurality of data pairs and the associated plurality of alignment probabilities; and applying the data transformation function as a part of a voice conversion process.

16. The method of claim 15, wherein determining the data transformation function comprises calculating parameters according to one of Gaussian Mixture Model (GMM) techniques and codebook-based techniques, said parameters associated with the data transformation.

17. The method of claim 16, wherein calculation of the parameters comprises execution of an Expectation-Maximization algorithm.

18. The method of claim 15, wherein at least one of the plurality of alignment probabilities is a non-Boolean value.

19. The method of claim 15, wherein the first data sequence corresponds to a plurality of utterances produced by the first source speaker, the second data sequence corresponds to a plurality of utterances produced by the second source speaker, and the data transformation function comprises a voice conversion function and wherein each of the feature vectors represents a basic speech sound in a larger voice segment.

20. The method of claim 19, further comprising:

receiving third data sequence associated with the first source speaker, said third data sequence corresponding to speech vectors produced based on sound provided by the first source speaker; and applying the voice conversion function to the third data sequence.

21. An apparatus comprising:

a memory configured to store instructions; and a processor configured to process the instructions to perform a method comprising:

receiving a first sequence of feature vectors associated with a source speaker;

receiving a second sequence of feature vectors associated with a target speaker;

generating a third sequence of joint feature vectors, wherein the generation of each joint feature vector is based on:

a first vector from the first sequence;

a first vector from the second sequence; and a first probability value representing the probability that the first vector from the first sequence and the first vector from the second sequence are time aligned to the same feature in their respective sequences; and applying the third sequence of joint feature vectors as a part of a voice conversion process.

22. The apparatus of claim 21, wherein the first sequence contains a different number of feature vectors than the second sequence.

23. The apparatus of claim 21, wherein the first sequence corresponds to a plurality of utterances produced by a first speaker, and the second sequence corresponds to the same plurality of utterances produced by a second speaker, and wherein each of the vectors represents a basic speech sound in a larger voice segment.

24. The apparatus of claim 21, wherein a Hidden Markov Model is applied to estimate the first probability value.

25. The apparatus of claim 21, wherein the probability is a non-Boolean value.

26. The apparatus of claim 21, wherein for the generation of the third sequence of joint feature vectors, the vector from the first sequence and the vector from the second sequence are different vectors for each joint feature vector in the third sequence.

27. The apparatus of claim 21, wherein the generation of at least one of the joint feature vectors is further based on:

a second vector from the first sequence;

a second vector from the second sequence; and a second probability value representing the probability that the second vector from the first sequence and the second vector from the second sequence are time aligned to the same feature in their respective sequences.

28. One or more computer readable media storing computer-executable instructions which, when executed by a processor, cause the processor to perform a method comprising:

receiving a first data sequence associated with a first source speaker;

receiving a second data sequence associated with a second source speaker;

identifying a plurality of data pairs, each data pair comprising an item from the first data sequence and an item from the second data sequence;

determining a plurality of alignment probabilities, each alignment probability associated with one of the plurality of data pairs and comprising a probability value that the item from the first data sequence is time aligned with the item from the second data sequence;

determining a data transformation function based on the plurality of data pairs and the associated plurality of alignment probabilities; and applying the data transformation function as a part of a voice conversion process.

29. The one or more computer readable media of claim 28, wherein determining the data transformation function comprises calculating parameters according to one of Gaussian Mixture Model (GMM) techniques and codebook-based techniques, said parameters associated with the data transformation.

30. The one or more computer readable media of claim 29, wherein calculating of the parameters comprises execution of an Expectation-Maximization algorithm.

31. The one or more computer readable media of claim 28, wherein at least one of the plurality of alignment probabilities is a non-Boolean value.

32. The one or more computer readable media of claim 28, wherein the first data sequence corresponds to a plurality of utterances produced by the first source speaker, the second data sequence corresponds to a plurality of utterances produced by the second source speaker, and the data transformation function comprises a voice conversion function, and wherein each of the feature vectors represents a basic speech sound in a larger voice segment.

33. The one or more computer readable media of claim 32, further comprising:

receiving third data sequence associated with the first source speaker, said third data sequence corresponding to speech vectors produced based on sound provided by the first source speaker; and applying the voice conversion function to the third data sequence.

34. An apparatus comprising:

a memory configured to store instructions; and a processor configured to process the instructions to perform a method comprising:

receiving a first data sequence associated with a first source speaker;

receiving a second data sequence associated with a second source speaker;

identifying a plurality of data pairs, each data pair comprising an item from the first data sequence and an item from the second data sequence;

determining a plurality of alignment probabilities, each alignment probability associated with one of the plurality of data pairs and comprising a probability value that the item from the first data sequence is aligned with the item from the second data sequence;

determining a data transformation function based on the plurality of data pairs and the associated plurality of alignment probabilities; and applying the data transformation function as a part of a voice conversion process.

35. The apparatus of claim 34, wherein determining the data transformation function comprises calculating parameters according to one of Gaussian Mixture Model (GMM) techniques and codebook-based techniques, said parameters associated with the data transformation.

36. The apparatus of claim 35, wherein calculation of the parameters comprises execution of an Expectation-Maximization algorithm.

37. The apparatus of claim 34, wherein at least one of the plurality of alignment probabilities is a non-Boolean value.

38. The apparatus of claim 34, wherein the first data sequence corresponds to a plurality of utterances produced by a first source speaker, the second data sequence corresponds to a plurality of utterances produced by a second source speaker, and the data transformation function comprises a voice conversion function, and wherein each of the feature vectors represents a base speech sound in a larger voice segment.

39. The apparatus of claim 38, wherein the processor is configured to process the instructions to:

receive third data sequence associated with the first source speaker, said third data sequence corresponding to speech vectors produced based on sound provided by the first source speaker; and apply the voice conversion function to the third data sequence.

* * * * *

UNITED STATES PATENT AND TRADEMARK OFFICE

CERTIFICATE OF CORRECTION

PATENT NO. : 7,505,950 B2
APPLICATION NO. : 11/380289
DATED : March 17, 2009
INVENTOR(S) : Jilei Tian et al.

It is certified that error appears in the above-identified patent and that said Letters Patent is hereby corrected as shown below:

In the claims section, Column 9, Claim 15, Line 53:

Please replace “identifying plurality of data pairs” with --identifying a plurality of data pairs--.

In the claims section, Column 10, Claim 23, Line 51:

Please replace “each of the vectors represents” with --each of the feature vectors represents--.

Signed and Sealed this

Sixth Day of October, 2009

David J. Kappos

*Director of the United States Patent and Trademark Office*